(12) United States Patent
Heitzler et al.

(10) Patent No.: US 9,134,051 B2
(45) Date of Patent: Sep. 15, 2015

(54) MAGNETOCALORIC HEAT GENERATOR

(75) Inventors: Jean-Claude Heitzler, Horbourg-Wihr (FR); Christian Muller, Strasbourg (FR)

(73) Assignee: Cooltech Applications Societe Par Actions Simplifiee, Holtzhheim (FR)

( * ) Notice: Subject to any disclaimer, the term of this patent is extended or adjusted under 35 U.S.C. 154(b) by 584 days.

(21) Appl. No.: 13/203,858

(22) PCT Filed: Mar. 16, 2010

(86) PCT No.: PCT/FR2010/000215
§ 371 (c)(1),
(2), (4) Date: Aug. 30, 2011

(87) PCT Pub. No.: WO2010/106242
PCT Pub. Date: Sep. 23, 2010

(65) Prior Publication Data
US 2011/0314836 A1    Dec. 29, 2011

(30) Foreign Application Priority Data
Mar. 20, 2009  (FR) ...................................... 09 51805

(51) Int. Cl.
*F25B 21/00* (2006.01)

(52) U.S. Cl.
CPC ........... *F25B 21/00* (2013.01); *F25B 2321/002* (2013.01); *Y02B 30/66* (2013.01)

(58) Field of Classification Search
CPC ..... F25B 21/00; F25B 2321/002; F25B 41/04
USPC .................................. 62/3.1, 3.3, 324.2, 325
See application file for complete search history.

(56) References Cited

U.S. PATENT DOCUMENTS

| | | | | |
|---|---|---|---|---|
| 2,589,775 | A | * | 3/1952 | Chilowsky ........................ 62/3.1 |
| 4,507,928 | A | * | 4/1985 | Johnson ........................... 62/3.1 |
| 4,735,053 | A | | 4/1988 | Carpetis |
| 2007/0199332 | A1 | | 8/2007 | Muller et al. |
| 2008/0276623 | A1 | | 11/2008 | Ali et al. |

FOREIGN PATENT DOCUMENTS

| | | | |
|---|---|---|---|
| FR | 2 588 065 A1 | 4/1987 | |
| JP | 59-180254 A | 10/1984 | |
| JP | 59-183265 A | 10/1984 | |
| WO | 2005/064245 A2 | 7/2005 | |

* cited by examiner

*Primary Examiner* — Cheryl J Tyler
*Assistant Examiner* — Harry Arant
(74) *Attorney, Agent, or Firm* — Davis & Bujold, P.L.L.C.; Michael J. Bujold

(57) ABSTRACT

A magnetocaloric heat generator (1) in which a driving mechanism is (26) in fluidic connection with first and second ends (3 and 4) of a thermal module (2), via at least one heat exchange mechanism (7, 27), so that the heat transfer fluid circulates in a closed constant-volume fluidic circuit through the magnetocaloric heat generator (1).

11 Claims, 3 Drawing Sheets

MAGNETOCALORIC HEAT GENERATOR

This application is a National Stage completion of PCT/FR2010/000215 filed Mar. 16, 2010, which claims priority from French patent application serial no. 0951805 filed Mar. 20, 2009.

TECHNICAL SCOPE

The present invention relates to a magnetocaloric heat generator comprising at least one thermal module having two ends and comprising at least one magnetocaloric element, a magnetic arrangement intended to subject each magnetocaloric element to a variable magnetic field, creating alternately in said magnetocaloric element a heating phase and a cooling phase, a means of circulation for a heat transfer fluid in thermal contact with said magnetocaloric element and circulating alternately towards one of the ends, and then towards the other and vice-versa, in synchronisation with the variation of the magnetic field, and at least one means for the exchange of the thermal energy produced by said thermal module with at least one device external to said heat generator.

It also relates to an exchange process of the thermal energy produced by the thermal module as it is defined above.

PRIOR TECHNIQUE

Magnetic refrigeration technology has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

The function of the heat exchanger is to transfer or exchange the thermal energy produced by the heat generator and transported by the heat transfer fluid to another (liquid or gaseous) fluid of one or several external applications without mixing them. These external applications may be the air surrounding the heat generator, such as a tubular thermal device integrated in the external application, a thermal enclosure or any other application in which a medium is to be refrigerated, air-conditioned, tempered or heated.

The known magnetocaloric heat generators comprise magnetocaloric elements through which a heat transfer fluid circulates alternatively. In a first known configuration, this heat transfer fluid is subjected to an alternating circulation between a first cell communicating with the first end of the magnetocaloric elements and a second cell communicating with the second end of the magnetocaloric elements, and a heat exchanger is in fluidic connection with each of said cells. Different valves are used to direct the heat transfer fluid in the heat exchanger(s) in function of the magnetocaloric cycle. In a second configuration, each cell is in fluidic connection with a heat exchanger integrated in a hydraulic loop.

In the first of the configurations above, the heat transfer fluid moves in a reciprocating movement between the two cells and passes through the heat exchanger of the external application every time it exits from the magnetocaloric elements and it enters the magnetocaloric elements, during the heating and cooling phases. Thus this configuration requires an important energy supply to move the heat transfer fluid in a reciprocating movement through all moving elements and through all of the piping, ducts and fittings that connect the heat exchanger of the external application and the magnetocaloric element, since the inertia of said fluid and of the moving elements must be overcome at every inversion of the direction of circulation. Furthermore, and more particularly un case of phases with a very short duration, thus with a high fluid speed or with a high frequency, the heat transfer between the heat exchanger and the heat transfer fluid is not completed when this heat transfer fluid changes direction to be reintroduced through the magnetocaloric elements. So the heat transfer fluid does not have the inlet temperature that would allow it to perform an optimum heat exchange with the magnetocaloric elements.

In the second of said configurations, a part of the thermal energy of the heat transfer fluid is lost between its exit from the magnetocaloric elements and its transfer area with the heat exchanger.

DESCRIPTION OF THE INVENTION

The present invention aims to overcome these disadvantages by proposing a solution to the problems described above. To that purpose, the magnetocaloric heat generator according to the invention is designed in such a way that the thermal energy transfer between the heat generator and the external application(s) is optimised.

For this purpose, the invention concerns a magnetocaloric heat generator of the kind defined in the preamble, characterized in that said heat transfer fluid driving means is in fluidic connection, in a closed constant-volume fluidic circuit, with both ends of said thermal module through said exchange means and in that said heat exchange means comprises two exchange areas distinct from each other, connected in parallel, and equipped with control means for the direction of circulation of the heat transfer fluid, so that each of them is crossed alternately in only one direction of circulation by the heat transfer fluid.

It also concerns an exchange process for the thermal energy produced by a heat generator according to the invention with at least one external device through at least one heat exchange means, said heat generator comprising at least one thermal module provided with two ends, through which a heat transfer fluid flows, and comprising at least one magnetocaloric element subjected to a variable magnetic field that leads to successive heating and cooling phases in it, said heat transfer fluid circulating through every magnetocaloric element alternately and in synchronisation with the variation of the magnetic field towards the one or the other of said ends and vice-versa, by means of a heat transfer fluid driving means. This process is characterised in that the heat transfer fluid is moved step by step in said magnetocaloric element, at every operating phase, by a driving means connected to heat exchange means in a closed constant-volume fluidic circuit, and in that one exchanges the thermal energy produced by said heat generator at every operating phase and transported by said heat transfer fluid at every magnetocaloric cycle comprising a heating phase and a cooling phase in two successive exchange areas of each thermal exchange means.

This way, at every heating or cooling phase, the heat transfer fluid that exits one of said ends is directed towards the driving means, through a first exchange area of said exchange means and, at every subsequent heating or cooling phase, the heat transfer fluid of said driving means is directed towards this same end, through a second exchange area of said exchange means, so that every portion of fluid exiting said end moves step by step, at every phase change, through the first exchange area towards the driving means or through the second exchange are towards the same end, without never mixing or moving according to opposite directions in the same circuit or piping section.

Advantageously, the inlet of the first exchange area and the outlet of the second exchange area of said thermal exchange means can be put in fluidic communication with one of the corresponding ends of said thermal module and the outlet of the first exchange area and the inlet of the second exchange area can be put in fluidic communication with each other and with said driving means.

In a first embodiment, the driving means may be a piston of a double-acting jack whose two chambers are in fluidic communication each with one of said ends of said thermal module through said heat exchange means.

In a second embodiment, said thermal module may comprise at least two magnetocaloric elements in fluidic connection through a common cell, each being subjected to a different heating or cooling phase and crossed by the heat transfer fluid in opposite directions, and said driving means can include:

one central actuator in fluidic connection with said common cell, and two end actuators, each in fluidic connection with one of the ends of said thermal module.

In this embodiment, said central actuator and said end actuators may comprise pistons that are controlled by a same control device.

BRIEF DESCRIPTION OF THE DRAWINGS

The present invention and its advantages will be better revealed in the following description of two embodiments given as non limiting examples, in reference to the drawings in appendix, in which.

ILLUSTRATIONS OF THE INVENTION

Figure 1A:
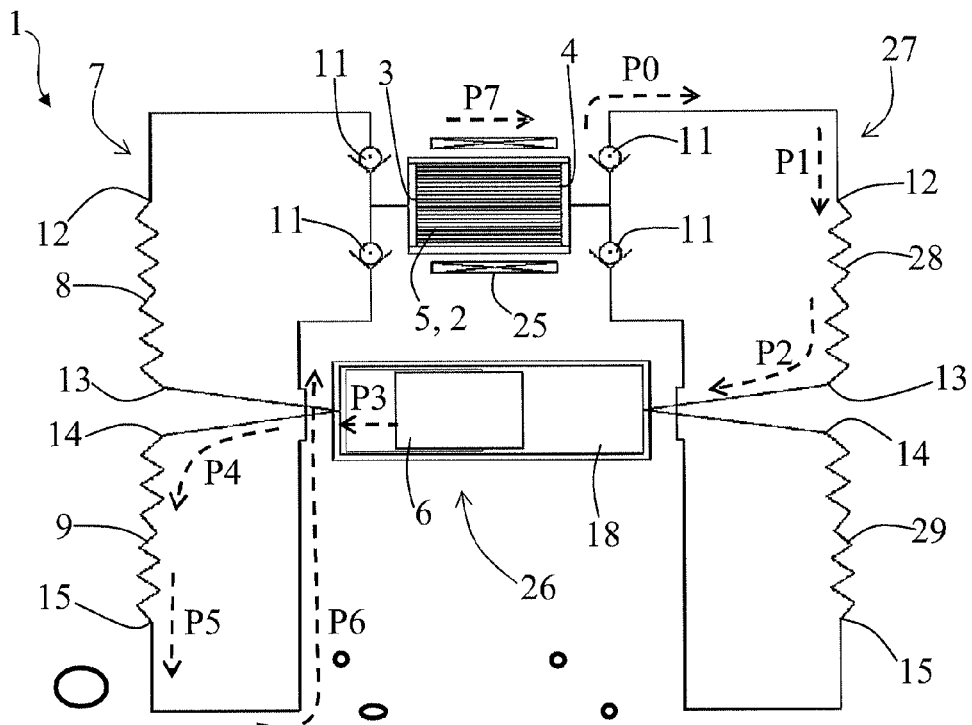
FIGS. 1A to 1D are schematic views of a heat generator according to a first embodiment, and FIGS. 2A et 2B are similar views of a heat generator according to a second embodiment.

In the illustrated embodiment examples, the identical parts or elements have the same numeric references.

The figures represent schematically a heat generator 1, 10 according to two embodiments of the invention, which implements an original heat transfer process that will be described later. This heat generator 1, 10 comprises a thermal module 2, 20 comprising a magnetocaloric element 5. It may of course comprise more than one thermal module 2, 20 and every module may comprise more than one magnetocaloric element 5.

Every magnetocaloric element 5 can be made up of one or several magnetocaloric materials through which a heat transfer fluid may flow. For that purpose, said magnetocaloric materials may be porous, so that their pores form open fluid passages. They may also be made in the form of a full block in which mini or micro-channels are machined or they may be made up of an assembly of possibly grooved superposed plates, between which the heat transfer fluid can flow. They may also be in the form of powder or particles so that the voids form passages for the fluid. Any other embodiment allowing the heat transfer fluid to perform heat exchange with every magnetocaloric element 5 can, of course, be suitable. A particular configuration may thus comprise a magnetocaloric element in the form of a blade through which the heat transfer fluid does not flow, but which is in thermal contact with said heat transfer fluid circulating, for example, on the upper and lower surfaces of this blade in two opposite directions, to end every time at the level of one of the ends of said blade making up the ends of the thermal module comprising this blade.

The thermal module 2, 20 is subjected to a variable magnetic field through the intermediary of a magnetic arrangement 25 that may be made up of an assembly of permanent magnets put in a relative movement with respect to every magnetocaloric element 5, as shown in all attached figures, or by an electromagnet powered sequentially or by any other similar means liable to create a magnetic field variation.

The magnetocaloric element 5 comprises two ends, a for example cold first end 3, and a for example hot second end 4, merging with the ends of the thermal module 2, 20. A heat transfer fluid is made to circulate through this magnetocaloric element 5 towards one or the other of the ends 3 and 4 and according to the variation of said magnetic field so as to create and then to maintain a temperature gradient between both ends 3 and 4 of this magnetocaloric element 5.

In reference to the first embodiment illustrated in FIGS. 1A to 1D, the heat transfer fluid is made to circulate in the magnetocaloric element 5 according to a reciprocating movement imposed by the displacement of a piston 6 of a double-acting jack that forms the driving means 26 of the heat transfer fluid. Of course, any other means capable of moving the heat transfer fluid may be used, such as a membrane, for example. The displacement of the piston 6 or of a similar device is controlled by a control device, which is not represented, and which may be made of a cam, a magnetic device, a linear motor or any equivalent means capable of moving said pistons in a reciprocating movement. This piston 6 separates the volume of the liner in two chambers 17 and 18 separated from each other and in fluidic connection respectively with the ends 3 and 4 of the thermal module 2. The fluidic circuit in which the heat transfer fluid circulates is closed and has a constant volume. In the second embodiment illustrated in FIGS. 2A and 2B, the driving means 16 of the heat transfer fluid comprises three pistons 21, 22 and 23 which will be described later.

In both embodiments represented, the heat generator 1, 10 is intended to exchange efficiently thermal energy with two external devices and is equipped, for that purpose, with two heat exchange means 7, 27 connected respectively with the ends 3, 4 of the thermal module 2, 20, in series with the driving means 26. The heat transfer fluid flows through every heat exchange means 7, 27, which is connected thermally with an external application or device and which connects fluidically the driving means 26 with both ends 3, 4 of the thermal module 2, 20.

Even though, in the embodiment examples described, the heat generators 1, 10 comprise two identical heat exchange means 7, 27, the invention also extends to the heat generators that comprise only one heat exchange means 7, 27 connected with one of the ends 3 or 4, or possibly different heat exchange means connected with the ends 3 and 4 of the thermal module 2, 20.

The heat exchange means 7 and 27 comprise advantageously two exchange areas 8 and 9, respectively 28 and 29, through which the heat transfer fluid flows alternately. The fact of comprising several exchange areas 8 and 9 or 28 and 29 allows increasing the heat exchange capacity between the heat generator 1, 10 and the external device connected thermally with said means of exchange 7, 27.

Furthermore, connecting fluidically the driving means 26, 16 with the heat module 2, 20 through the heat exchange means 7, 27 allows discarding additional driving means to ensure the heat transfer fluid movement function both in the thermal module 2, 20 and in the heat exchange means 7, 27.

This configuration allows achieving a reduction of consumed energy, a performance improvement (COP) and a reduction of the size of the heat generator 1, 10.

In both represented heat generators 1, 10, the two exchange areas 8, 9 and 28, 29 of the heat exchange means 7 and 27 are arranged in parallel or in derivation in the fluidic circuit connecting the driving means 26, 16 to the ends 3, 4 of the thermal module 2, 20 so that the heat transfer fluid always flows through them in only one direction of circulation. More specifically, the heat transfer fluid circulates towards the first exchange area 8, 28 when it exits one of the ends 3, 4 of the thermal module 2, 20, then it circulates, on its way back, during the following phase, towards the second exchange area 9, 29 when it enters one of the ends 3, 4 of the thermal module 2, 20. For that purpose, means 11 to control the direction of circulation of the heat transfer fluid, such as non-return valves for example, are mounted in said fluidic circuit. Each of the ends 3 and 4 of the thermal module 2, 20 is connected with the inlet 12 of the first exchange area 8, 28 and with the outlet 15 of the second exchange area 9, 29 of the corresponding heat exchange means 7, 27. The outlet 13 of the first exchange area 8, 28 and the inlet 14 of the second exchange area 9, 29 are in fluidic connection with each other and with the chambers 17, 18 of the driving means 26, 16.

FIGS. 1A to 1D represent the movement of the heat transfer fluid step by step, per section P0 to P7 and P0' to P7', in the heat generator 1, through the fluidic circuit, during four successive phases. By phase, one must understand heating or cooling phase, a magnetic cycle corresponding to a heating phase followed by a cooling phase. The magnetocaloric material 5 represented in the attached figures heats up as soon as it is subjected to a magnetic field and cools down when it is removed from the magnetic field or subjected to a very weak field.

The phase represented in FIG. 1A is a heating phase, since the magnetic arrangement 25 subjects the magnetocaloric material 5 to a magnetic field. During this phase, the piston 6 moves towards left to move the heat transfer fluid in the magnetocaloric material 5 (fluid portion P6) from the cold end 3 located on the left on FIG. 1A towards the hot end 4 located on the right on FIG. 1A. The heat transfer fluid exiting chamber 17 of piston 6 (fluid portion P3) circulates towards the second exchange area 9 of the heat exchange means 7 up to the cold end 3 of the thermal module 2 (fluid portions P4, then P5). This direction of circulation is imposed by the non-return valves 11 arranged in the closed fluidic circuit. The heat transfer fluid passes through the magnetocaloric material 5 (portion P6) and is then directed by the non-return valves 11 towards the first exchange area 28 of the heat exchange means 27, in direction of chamber 18 of piston 6 (fluid portions P7, P0, P1, then P2). The heat transfer fluid proceeds with its travel and fills chamber 18 of the driving means 26.

Two non-return valves are arranged in opposition in the fluidic circuit between each end 3 or 4 of the thermal module 2, 20 and the corresponding chamber 17 or 18 of the driving means 26, 16. So, in the first exchange area 8, 28, the heat transfer fluid can only circulate from said end 3 or 4 towards the corresponding chamber 17 or 18 (=outward circuit of the fluid), and in the second exchange area 9, 29, the heat transfer fluid can only circulate from said chamber 17 or 18 towards the corresponding end 3 or 4 (=return circuit of the fluid).

It can be noted that, during the heating phase represented in FIG. 1A, the heat transfer fluid only moves in the second exchange area 9 of the heat exchange means 7 located on the cold side and in the first exchange area 28 of the heat exchange means 27 located on the hot side.

Figure 1B:
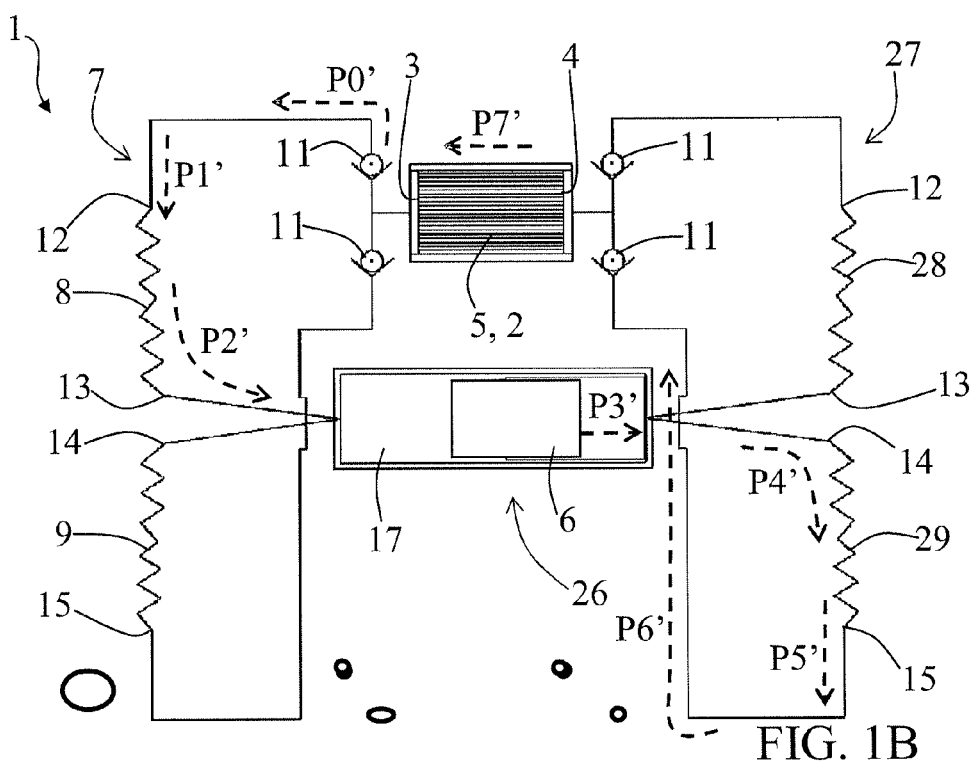

During the following phase, which consists in a cooling phase in reference to FIG. 1B, the fluid only circulates in the two other exchange areas, that is to say the first exchange area 8 of the exchange means 7 located on the cold side and the second exchange area 29 of the exchange means 27 located on the hot side. The piston 6 moves towards the right to move the heat transfer fluid in the magnetocaloric material 5 (fluid portion P6') from the hot end 4 towards the cold end 3. The heat transfer fluid exiting chamber 18 of piston 6 (fluid portion P3') circulates towards the second exchange area 29 of the heat exchange means 27 up to the hot end 4 of the thermal module 2 (fluid portions P4', then P5'). This direction of circulation is imposed by the non-return valves 11 arranged in the closed fluidic circuit. The heat transfer fluid passes through the magnetocaloric material 5 (portion P6') and is then directed by the non-return valves 11 towards the first exchange area 8 of the heat exchange means 7, towards chamber 17 of piston 6 (fluid portions P7', P0', P1', then P2'). The heat transfer fluid proceeds with its travel and fills chamber 17 of the driving means 26.

Figure 1C:
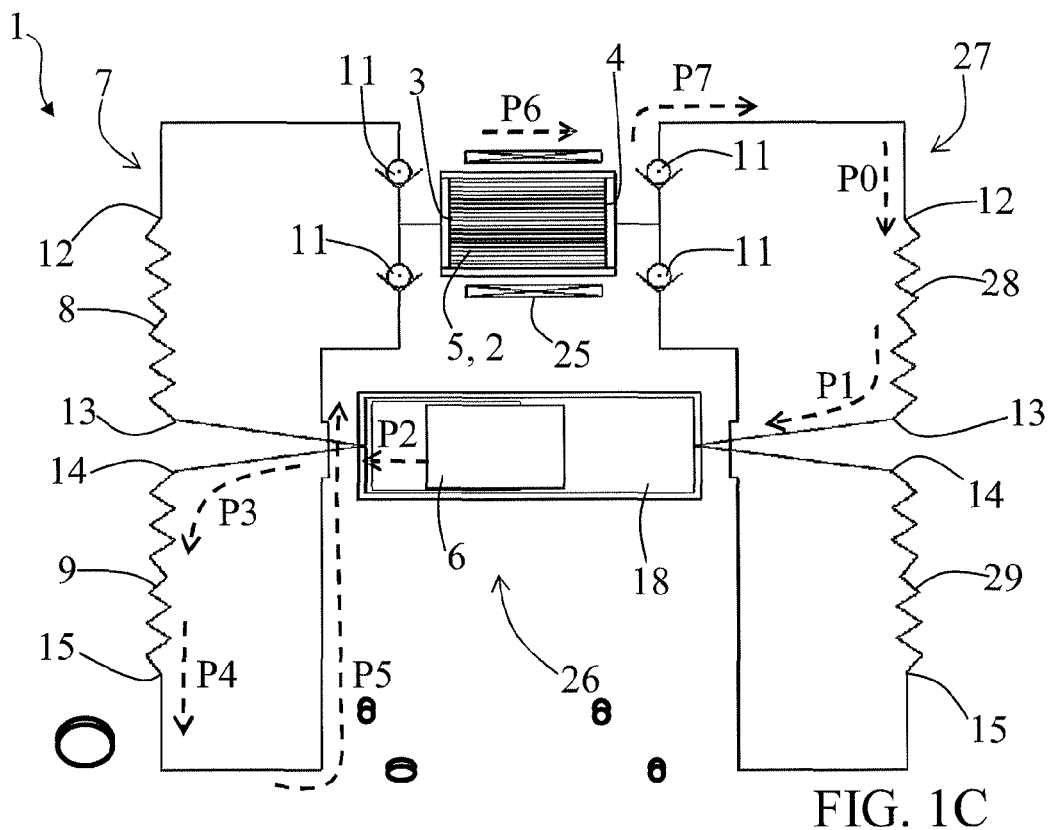

During the following heating phase, represented in FIG. 1C, the fluid circulates the same way as described in reference to FIG. 1A, so that fluid portion P7 is replaced with fluid portion P6, fluid portion P6 is replaced with fluid portion P5, and so on.

Figure 1D:
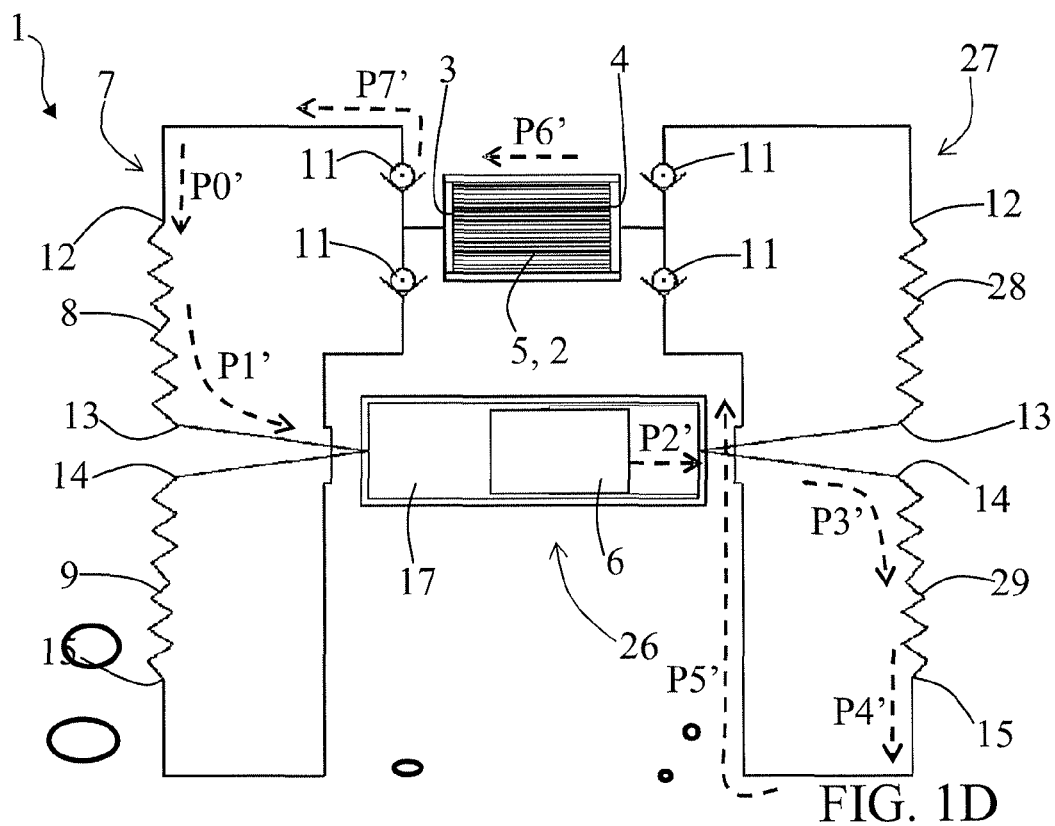

Likewise, during the following cooling phase illustrated in FIG. 1D, the fluid is moved the same way as described in reference to FIG. 1B, so that fluid portion P7' is replaced with fluid portion P6', fluid portion P6' is replaced with fluid portion P5', and so on.

At every thermal phase, the heat transfer fluid circulates through a different heat exchange area of the heat exchange means 7, 27. The fluid exiting one of the ends 3 or 4 of the heat module 2, 20 returns in this same end 3 or 4 only after having passed through both exchange areas 8 and 9, or 28 and 29 of the corresponding heat exchange means 7, 27. This way, a maximum of energy could be exchanged between the heat generator 1 and the external application. Furthermore, the heat transfer fluid that enters again the thermal module 2 achieved a considerable heat exchange with the external application through the intermediary of the heat exchange means 7 and 17, and finds itself at a temperature suitable for passing again through the magnetocaloric material 5 during the following phase.

Furthermore, this heat exchange is favoured by the fact that the heat transfer fluid circulates step by step and that every portion of fluid is moved only every second phase, so that the exchange time is increased, which improves the heat exchange with the external application in the exchange areas 8, 9, 28, 29. Indeed, the total power exchanged is equal to the power exchanged during the active interval of time (fluid in movement) added to power exchanged during the static interval of time (fluid not in movement).

In the example illustrated in FIGS. 1A to 1D, the outlet 13 of the first exchange area 8, 28 and the inlet 14 of the second exchange area 9, 29 are connected directly with the corresponding chamber 17, 18 of the driving means 26. It may also be provided to connect them fluidically with each other at a junction point, which is connected itself fluidically with the corresponding chamber 17 or 18 of said driving means 26. In such a configuration, the distance, and more specifically the volume between this junction point and the concerned chamber 17, 18 must be as small as possible in order to avoid the appearance of dead zones in which the heat transfer fluid moves in a reciprocating way without exiting said dead zones.

Figure 2A:
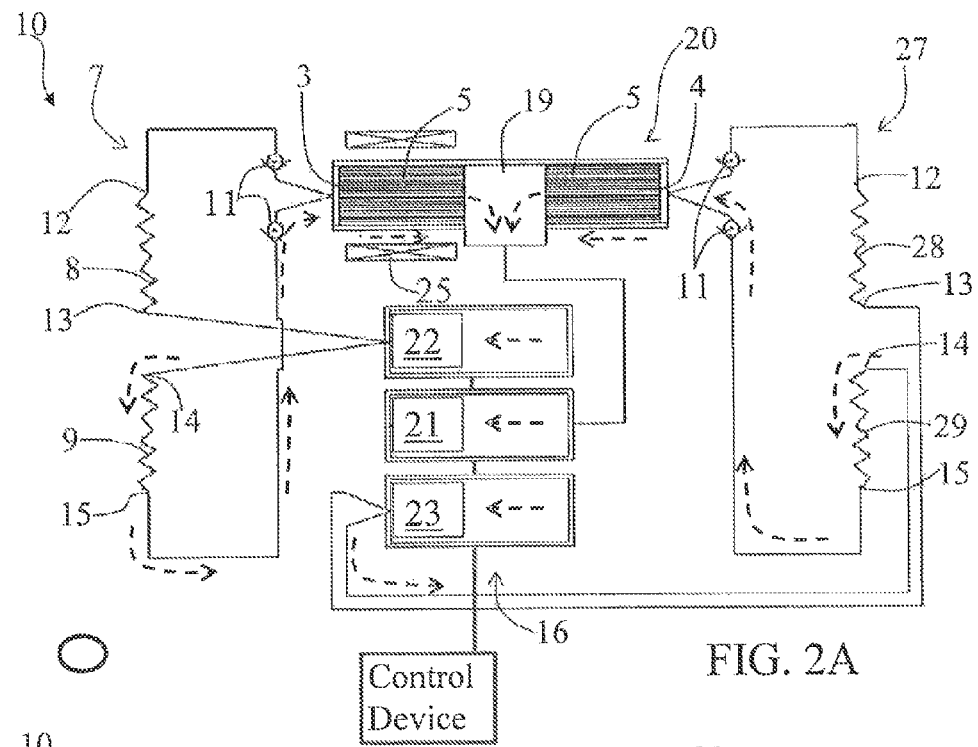
Figure 2B:
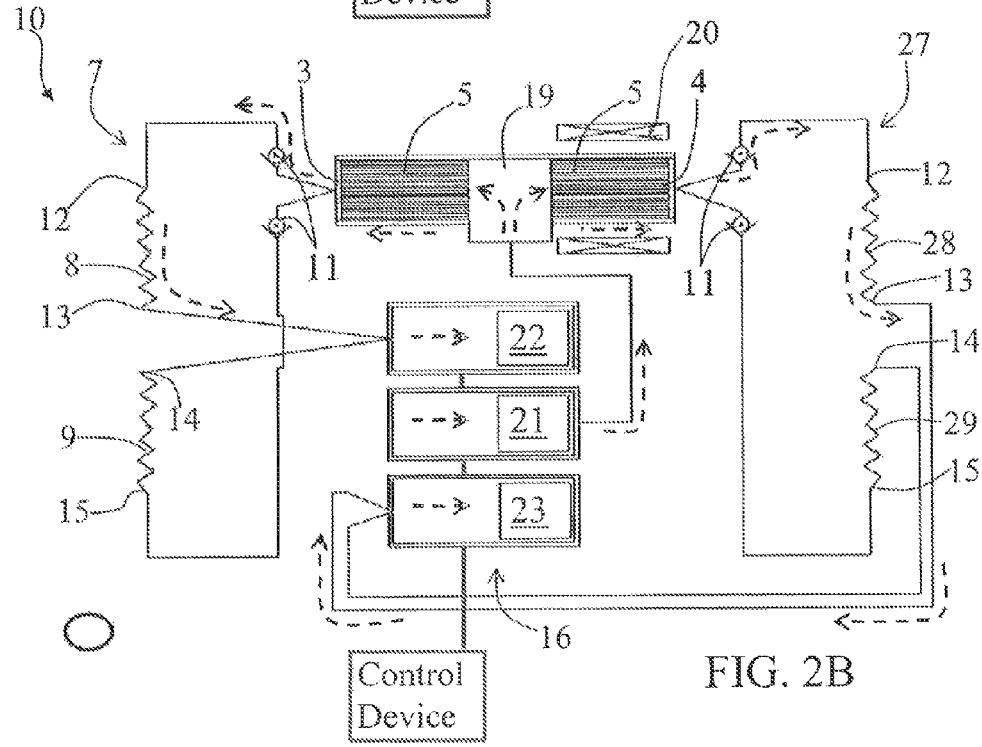

The heat generator 10 represented in FIGS. 2A and 2B consists in a second embodiment in which the thermal module 20 comprises two magnetocaloric elements 5 which are constantly subjected to a different magnetocaloric phase. So, when one of the magnetocaloric elements 5 is subjected to a magnetic field and warms up, the other is outside of the magnetic field or is subjected to a very weak magnetic field and cools down, and vice-versa. Furthermore, the heat transfer fluid circulates in both magnetocaloric elements 5 in opposite directions, that is to say towards one or the other end 3, 4 of the thermal module 20, and vice-versa.

The heat exchange means 7 and 27 connected with the thermal module 20 of this heat generator 10 are the same ones as those of the heat generator 1 represented in FIGS. 1A to 1D. The heat transfer fluid driving means 16 has nonetheless a different configuration. It indeed comprises a central actuator 21 in the form of a piston, which is in fluidic connection with the cell 19 common to both magnetocaloric elements 5 and which moves the heat transfer fluid through this common cell 19, towards the magnetocaloric elements 5 or in the opposite direction. It also comprises two end actuators 22 and 23, also in the form of pistons, each in fluidic connection with one of the ends 3, respectively 4 of the thermal module 20. The displacement of all of these pistons is controlled by a single control device, not represented, and which can be made of a cam, a magnetic device, a linear motor or any other equivalent means capable of moving said pistons in a reciprocating movement.

So, in this configuration, every heat exchange means 7, 27 is connected with one of the end actuators 22 and 23. The operation of the heat generator 10 is approximately identical with regard to the drive of the heat transfer fluid circulation during every second phase in each of the exchange areas 8 and 9 or 28 and 29 of the heat exchange means 7 and 27.

In reference to FIG. 2A, which represents a first phase, the magnetocaloric element 5 located left on the figure is subjected to a heating phase and the magnetocaloric element 5 located right on the figure is subjected to a cooling phase. The whole of the pistons 21, 22, 23 is displaced towards left and the heat transfer fluid circulates, on the one hand, from the chamber of piston 22 towards the second exchange area 9 of the heat exchange means 7 connected with the (cold) end 3 of the thermal module 20 and towards said end 3, to pass through the magnetocaloric element 5 located on the right, on the cold side, then the common cell 19 up to the chamber of piston 21 forming the central actuator and, on the other hand, the heat transfer fluid circulates from the chamber of piston 23 towards the second exchange area 29 of the heat exchange means 27 connected with the (hot) end 4 of the thermal module 20 and towards said end 4, to pass through the magnetocaloric element 5 located on the left, on the hot side, then the common cell 19 up to the chamber of piston 21 forming the central actuator. Consequently, the liner of piston 21 must have a volume that is the double of that of the liners of the other pistons 22 and 23.

As in the previous example, the direction of circulation of the heat transfer fluid is imposed by non-return valves 11 or similar devices.

In this heat generator 10, the inlet 12 of the first exchange area 8, 28 and the outlet 15 of the second exchange area 9, 29 of the heat exchange means 7, 27 are in direct fluidic connection with the corresponding end 3, 4. Now in the heat generator 1 of FIGS. 1A to 1D, the inlet 12 of the first exchange area 8, 28 and the outlet 15 of the second exchange area 9, 29 are connected with each other at a junction point that is itself connected with the corresponding end 3, 4. One or the other of the two connection types can be achieved in each of the two heat generators 1 and 10. However, the direct connection without junction point is advantageous since it allows avoiding the appearance of dead zones in which the heat transfer fluid moves in a reciprocating way without exiting said dead zones.

In the phase of FIG. 2A, one notes that the heat transfer fluid only moves in the circuit sections including the second exchange areas 8 and 28 of the exchange means 7 and 27.

During the following phase, represented in FIG. 2B, the magnetocaloric element 5 located on the cold side is not subjected to the magnetic field any more or is subjected to a very weak field, while the other magnetocaloric element 5 is subjected to a magnetic field, and pistons 21, 22 and 23 move towards right. This way, the heat transfer fluid moves from the chamber of the central piston 21 towards the common chamber 19, then a part of this heat transfer fluid passes through the magnetocaloric element 5 located on the cold (left) side and then through the first exchange area 8 of the heat exchange means 7 located on the same side to fill the chamber of piston 22, while the other part of this heat transfer fluid passes through the magnetocaloric element 5 located on the hot (right) side, then through the first exchange area 28 of the heat exchange means 27 located on the same side to fill the chamber of piston 23.

Also in this phase, the heat transfer fluid moves only through two exchange areas 8 and 28, that is to say the areas through which no fluid has passed during the previous phase.

In this configuration, the fluid also moves step by step, every second phase, through each exchange area 8, 28, 9, 29. So, the exchange times are increased without affecting the heating and cooling phases. This allows exchanging better and for a longer period the thermal energy produced by the heat generator 1, 10 with every external application or device.

Furthermore, and this applies also to the two heat generators 1, 10 illustrated, every portion of heat transfer fluid moves constantly in the same direction, so that no inertia, that would be due to a change of direction of circulation, must be overcome.

For that purpose, the first and second exchange areas 8, 28 and 9, 29 can be arranged in the external device or directly in contact with it. They may, as an example, be made in the form of ducts out of a heat-conductive material such as for example aluminium or copper and the external device may be a liquid medium (bath to be heated up, cooled down or tempered, for example) or a gaseous medium (room or volume to be heated up, cooled down or tempered, for example).

In both described embodiments, the means for controlling the direction of circulation of the heat transfer fluid are non-return valves. They can however be replaced with any equivalent means achieving the same function, such as electrically hydraulic valves controlled electrically or by means of a pressure difference, for example.

Finally, the invention is not limited to the integration of only one or two magnetocaloric elements 5 in a thermal module 2, 20, or to a heat generator 1, 10 comprising only one thermal module 2, 20.

Both heat generators 1, 10 described implement the thermal energy exchange process according to the invention. The exchange means 7, 27 allow exchanging the energy produced by the generator with external devices. For that purpose, the fluid is moved alternately step by step in two exchange areas 9, 28 and then 8, 29 of two heat exchange means 7, 27, in function of the magnetocaloric phases. The displacement of the fluid in every exchange area 9, 28, 8, 29 is unidirectional and is achieved by means of a driving device connected with the two heat exchange means 7, 27.

POSSIBILITIES FOR INDUSTRIAL APPLICATION

This description shows clearly that the invention allows reaching the goals defined, that is to say to offer a heat generator 1, 10 with a simple configuration and provided with at least one heat exchange means 7, 27 capable of de transferring to an external application a maximum of thermal energy produced by said heat generator 1, 10, as well as a process that allows making the heat exchanges between a thermal module 2, 20 and the exterior more efficient (the exterior being made of an external device or application).

The process and the heat generator 1, 10 according to the invention can find an application, as well industrial as domestic, in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetocaloric heat generator (10) comprising:
   at least one thermal module (20) having first and second ends (3, 4) and comprising at least two magnetocaloric elements (5);
   a magnetic arrangement for subjecting the magnetocaloric elements (5) to a variable magnetic field and alternately creating, in each of the two magnetocaloric elements (5), a heating phase and a cooling phase;
   a driving means (16) for circulating a heat transfer fluid in thermal contact with the two magnetocaloric elements (5) and circulating alternately towards the one (3) of the first and the second ends, and then towards the other (4) of the first and the second ends and vice-versa, in synchronisation with a variation of the magnetic field;
   first and second heat exchange means (7, 27) for transferring thermal energy produced by the thermal module (20) to at least one device external to the heat generator (10);
   wherein the heat transfer fluid driving means (16) is in fluidic communication, in a closed constant-volume fluidic circuit, with both the first and the second ends (3 and 4) of the thermal module (20) through the first and the second heat exchange means (7, 27);
   the first and the second heat exchange means (7, 27) each comprises first and second exchange areas (8 and 9, 28 and 29) distinct from one another, connected in parallel, and equipped with control means (11) for directing circulation of the heat transfer fluid, so that each of the first and the second exchange areas (8 and 9, 28 and 29) are alternatively crossed in only one direction of circulation;
   the two magnetocaloric elements (5) are in fluidic connection through a common cell (19), and each of the two magnetocaloric elements (5) are subjected to a different heating or cooling phase;
   the two magnetocaloric elements (5) are crossed by the heat transfer fluid in opposite directions; and
   the driving means (16) includes:
      a first actuator (21) which is in fluidic connection with the common cell (19) for moving the heat transfer fluid through the common cell (19) towards the two magnetocaloric elements (5) or away from the common cell (19) towards the first actuator (21);
      second and third actuators (22 and 23) which are each in fluidic connection with one of the first and the second ends (3 or 4) of the thermal module(20) and each of the second and the third actuators directly moves the heat transfer fluid; and
      the first central actuator (21) is designed to displace twice a volume of heat transfer fluid than is displaced by either the second or the third actuators (22 and 23).

2. The heat generator according to claim 1, wherein an inlet (12) of the first exchange area (8, 28) and an outlet (15) of the second exchange area (9, 29) of each of the first and second heat exchange means (7, 27) are in fluidic communication with a corresponding one of the first and the second ends (3, 4) of the thermal module (20) and an outlet (13) of the first exchange area (8, 28) and an inlet (14) of the second exchange area (9, 29) are in fluidic communication with one another and with the driving means (16).

3. The heat generator according to claim 2, wherein the driving means is a piston (6) of a double-acting jack with two chambers (17, 18) each in fluidic communication with one of the first and the second ends (3 or 4) of the thermal module (2) through the first and the second heat exchange means (7, 27).

4. The heat generator according to claim 1, wherein the first actuator (21) and the second and the third actuators (22, 23) comprise pistons that are controlled by a same control device.

5. The heat generator according to claim 1, wherein one of the two magnetocaloric elements (5) is located between the first actuator (21) and each of the second and the third actuators (22, 23).

6. The heat generator according to claim 1, wherein one of the two magnetocaloric elements (5) and one of the first and the second heat exchange means (7, 27) are located between the first actuator (21) and each of the second and the third actuators (22, 23).

7. The heat generator according to claim 1, wherein the common cell (19), one of the two magnetocaloric elements (5) and one of the first and the second heat exchange means (7, 27) are located between the first actuator (21) and each of the second and the third actuators (22, 23).

8. The heat generator according to claim 1, wherein the first actuator (21), in an alternating fashion, transfers fluid out of the common cell (19) into the two magnetocaloric elements (5) and transfers fluid from the two magnetocaloric elements (5) into the common cell in synchronization with a variation of the magnetic field.

9. The heat generator according to claim 1, wherein the first actuator (21), in an alternating fashion, transfers fluid out of the common cell (19) into the two magnetocaloric elements (5) and into a respective one of the first and the second heat exchange means (7, 27) and transfers fluid from the first and the second heat exchange means (7, 27) and the two magnetocaloric elements (5) into the common cell in synchronization with a variation of the magnetic field.

10. A magnetocaloric heat generator (1, 10) comprising:
    at least one thermal module (2, 20) having first and second ends (3, 4) and comprising at least one magnetocaloric element (5);
    a magnetic arrangement for subjecting the magnetocaloric element (5) to a variable magnetic field and alternately creating, in the magnetocaloric element (5), a heating phase and a cooling phase;
    a driving means (26, 16) for circulating a heat transfer fluid in thermal contact with the magnetocaloric element (5) and circulating alternately towards the one (3) of the first and the second ends, and then towards the other (4) of the first and the second ends and vice-versa, in synchronisation with a variation of the magnetic field; and
    first and second heat exchange means (7, 27) for transferring thermal energy produced by the thermal module (2, 20) to at least one device external to the heat generator (1, 10);

wherein the heat transfer fluid driving means (26, 16) is in fluidic communication, in a closed constant-volume fluidic circuit, with both the first and the second ends (3 and 4) of the thermal module (2, 20) through the first and the second exchange means (7, 27); and the first and the second heat exchange means (7, 27) each comprise first and second exchange areas (8 and 9, 28 and 29); and the first and the second heat exchange means (7, 27) are separate and distinct from one another, connected in parallel, and equipped with control means (11) that directs the circulation of the heat transfer fluid in only a single direction, with fluid alternatingly flowing through only the first exchange area and then flowing only through the second exchange area; and the driving means comprising a first actuator, a second actuator and a third actuator, wherein the second and the third actuators (22 and 23) are each in fluidic communication with one of the first and the second ends (3 or 4) of the thermal module (20) such that each of the second and the third actuators directly move the heat transfer fluid.

11. The heat generator according to claim 10, wherein control means (11) directs the circulation such that when fluid is flowing through the first exchange area of the first heat exchange means, the fluid in the second exchange area of the first heat exchange means area is stationary, and when fluid is moving through the second exchange area of the first heat exchange means, the fluid in the first exchange area of the first heat exchange means is stationary, while when fluid is flowing through the first exchange area of the second heat exchange means, the fluid in the second exchange area of the second heat exchange means area is stationary, and when fluid is moving through the second exchange area of the second heat exchange means, the fluid in the first exchange area of the second heat exchange means is stationary.

* * * * *